United States Patent Office 2,952,507
Patented Sept. 13, 1960

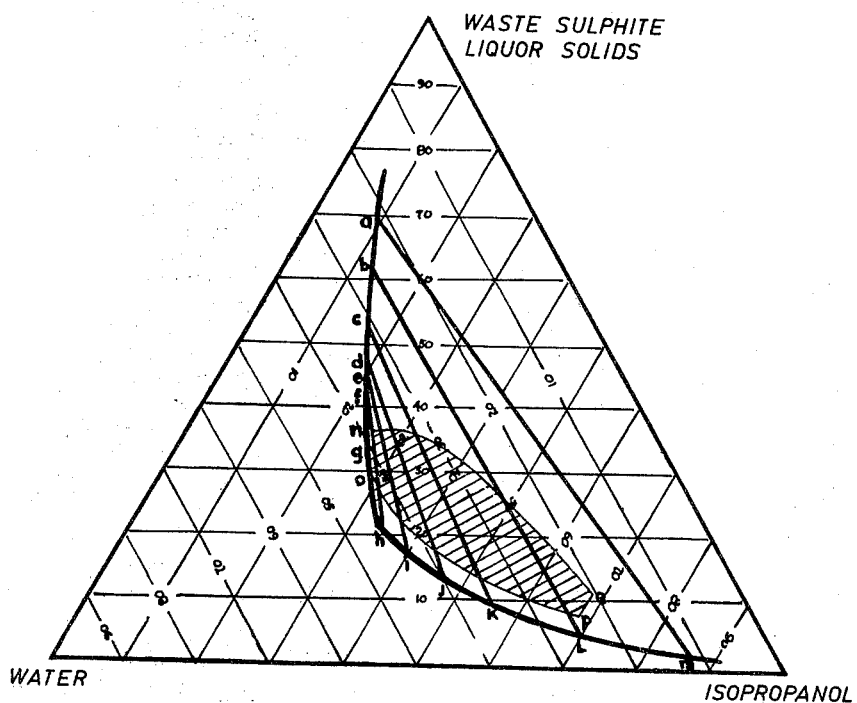

2,952,507
PRODUCTION OF A TANNING AGENT FROM WASTE SULPHITE LIQUOR BY SOLVENT EXTRACTION

Harry Borden Marshall, Toronto, Ontario, and Alan C. Shaw, Don Mills, Toronto, Ontario, Canada, assignors to Ontario Research Foundation, Toronto, Ontario, Canada Filed Nov. 24, 1958, Ser. No. 775,914

12 Claims. (Cl. 8—94.31)

This invention relates to a method of producing tanning agents derived from waste sulphite liquor.

There has previously been extensive investigation of the possibility of using lignin compounds, particularly those occurring in waste sulphite liquor, as a replacement for natural tannins. Waste sulphite liquor has successfully been used in small percentages as an extender and solubilizing agent for the natural tanning materials but experimental and industrial experience with tanning agents derived predominantly or completely from waste sulphite liquor has been discouraging. Certain tanning properties have been observed to be present but when the tanned product is dried the hide structure collapses and the fibres fuse together to yield a thin, dark, horny material which is not suitable for use as leather.

Previous theories to account for the failure of waste sulphite liquor to produce satisfactory tannages, despite the fact that it combines irreversibly with hide substance, have attributed this to the chemical structure of its lignin components.

K. H. Gustavson, in several papers on this subject (Svensk Paperstidn. 44, 193–200 (1942); Tek. Tid. Uppl. C. Kemi. 73, 59 (1943); Ing. Vetenskaps Akad. Handl. No. 177 (1944)), stated that ligninsulphonate compounds possess great affinity for hide proteins and a major part of the lignin complex is irreversibly bound during the tanning process. However, in spite of these valuable properties, the hydrothermal stability of the treated hides decreases. According to Gustavson this deficiency in tanning power is attributed to structural deficiencies in the ligninsulphonic acids rather than to their molecular size, since the identical negative effect is obtained by both the high and low molecular weight fractions.

K. Freudenberg (Collegium, 19, 3 (1937)) likewise has compared the structure of lignin with that of the natural tannins and on the basis of this comparison has indicated the properties which contribute to, or detract from, its ability to produce a successful tannage. Tanning by ligninsulphonic acid is attributed to the presence of sulphonic acid and phenolic hydroxyl groups, although ligninsulphonates posessesses a smaller percentage of the latter than do the natural tanning agents. Thus he has postulated the problem of converting waste sulphite liquor into a satisfactory tanning agent as essentially that of increasing its phenolic hydroxyl content.

Salvesen (Journal American Leather Chemists' Association, 47, 271 (1952)) on the basis of experimental evidence, has suggested that "a more valube tanning material would result by segregating the higher molecular weight, less sulfonated lignosulfonate from the rest of the components of spent sulphite liquor. Such fractionation is technically and economically feasible by controlled precipation with lime. Through further processing steps, the segregated fraction is converted to a sodium salt with acidity suitably adjusted for tanning."

Lollar et al. have likewise indicated a preference for the high molecular fraction of waste sulphite liquor as a tanning agent. In a publication on "Tanning Properties of Lignosulphonates" (Journal American Leather Chemists' Association, 42, 250 (1947)) they state, "the desirability of lignosulphonates for leather-making appears to correlate directly with their precipitability with high molecular weight amines, such as beta-naphthylamine. This suggests that the larger molecular weight fractions are more desirable."

Irwin A. Pearl, in a publication entitled "Present Status of Chemical Utilization of Lignin" (Forest Products Journal, vol. VII, No. 12, December 1957), postulated that tanning agents from aspen liquors have advantages over similar materials prepared from coniferous liquors.

The present state of the art may, therefore, be summarized as follows:

(1) Ligninsulphonates are known to combine with hide substance.

(2) Treatment with ligninsulphonates does not stabilize the hide structure, and thin, empty, inflexible, almost horny leathers are produced.

(3) A preference has been expressed for the higher molecular weight fractions by some authorities, but both the high and the low molecular weight fractions are reported to be unsatisfactory tanning materials.

(4) The deficiencies of ligninsulphonates as tanning agents have been attributed to structural defects, such as the shortage of phenolic hydroxyl groups. Proposed methods for improving the tanning potential of ligninsulphonates have concentrated on alteration of the structure by chemical treatment.

(5) The best tanning properties have been believed to be obtained with waste liquors derived from hardwoods.

Our invention is based on the discovery that, contrary to the foregoing generally accepted conclusions, true tanning agents with the ability to stabilize hide and produce a full, soft, flexible leather, may be obtained in abundance from softwood waste liquor by a simple solvent extraction with a water miscible monohydric alcohol which will form two phases with waste sulphite solids and water, preferably isopropanol. It is neither necessary nor desirable to modify the structure of lignin sulphonate compounds by chemical reaction.

We have found that, from a tannage point of view, waste sulphite liquor contains three principal fractions, namely:

(I) Non-tannins—those substances which do not combine with hide.

(II) Interfering substances—those substances which combine with hide, but which do not have satisfactory tanning properties. These are essentially the high molecular weight materials which are characterised by their slowness of penetration, and by their failure to stabilize the hide structure. Hides treated with these substances are almost black, brittle, thin, and completely horny.

(III) Effective tannins—those substances which combine with hide to produce a full, soft, flexible leather and which are characterized by having a low molecular weight, by rapid penetration of the hide, by being soluble in aqueous solutions of water miscible alcohols such as isopropanol, and by being highly reactive, as will be explained below.

The presence in waste sulphite liquor of these effective tannins with true tanning properties has not heretofore been recognized and could not have been anticipated from knowledge previously existing in the art.

It can now be understood that when tannage is attempted with the whole waste sulphite liquor, interfering substances combine with and block the reactive sites of the hide. Extensive reaction with effective tannins to produce a leather is, therefore, prevented. In consequence the hide structure is not stabilized and a thin, brittle, dark, horn-like structure, typical of whole waste sulphite liquor tannage, results.

If on the other hand these interfering substances are removed from the liquor, or their concentration substantially reduced by the methods of our invention, then extensive combination of hide substance with the effective tannins occurs, the hide structure is stabilized, and a soft flexible leather results. The effect of segregating the effective tannins is thus not merely one of improving existing properties, but rather the development of new and qualitatively different properties not previously apparent in the liquor.

We have found that effective tanning can be accomplished with tanning agents obtained from softwood sulphite waste liquors by carrying out the following steps:

(1) Concentrate the waste sulphite liquor (the term concentration is used herein to denote removal of water, such as by evaporation, but does not include a treatment which fundamentally changes the chemical nature of the ligninsulphonate components of the waste liquor.

(2) Mix the concentrated waste liquor with a water miscible monohydric alcohol such as isopropanol that will form two phases with concentrated waste liquor, under conditions such that between 15% and 65%, and preferably 40 to 50% of the solids are found in the upper phase.

(3) Separate the two phases.

(4) Remove the solvent from the upper phase to recover an effective tanning agent.

(5) Use the tanning agents thus produced to tan leather.

It will be appreciated that our invention resides not only in the five steps enumerated above but also in subcombinations of these steps, such as the production of effective tanning agents by the first four steps and the application to concentrated waste liquor by the last four steps.

The waste liquor from which tanning agents are derived in accordance with the invention are those of the acid sulphite pulping process. Any base including sodium, ammonium, calcium or magnesium base liquors may be chosen. It is, however, preferred that sodium or ammonium base liquors be used since these appear to give the best results in the practice of this invention. If calcium base liquors are employed the calcium must first be removed as the presence of calcium is harmful to tanning properties. When here and elsewhere we use the term "waste sulphite liquor" it is to be understood as meaning a waste sulphite liquor selected from the group consisting of sodium, ammonium, calcium and magnesium; and that if calcium base liquors are employed, the term presupposes a preliminary step involving the removal of calcium ions. The process of this invention may be applied also to waste liquors from the neutral sulphite process.

The alcohol is preferably isopropanol but can be other water miscible alcohols capable of forming two phases with concentrated waste sulphite such as normal propyl, tertiary butyl and isobutyl. The alcohol should preferably have not more than four carbon atoms. Methyl alcohol or ethyl alcohol could also be used but the high molecular ligninsulphonates precipitate out as a sludge which is difficult to process.

Where a two phase system of sulphite liquor solids alcohol and water is formed, we are of the opinion that solids are distributed between the two phases on the basis of solubility, functionality, and molecular weight; the substances dissolving in the upper, isopropanol-rich phase being more soluble in aqueous isopropanol, more highly functional, and of lower molecular weight. We have observed, for example, that those substances separated in the upper phase show an enhanced reactivity toward reactive aldehydes, and toward simple phenols. It is believed that this combination of lower molecular weight, high functionality, and enhanced reactivity, is responsible for the unexpected superior tanning properties of the product. However, we do not wish this to be considered an explanation limiting our invention.

We have found that when operating conditions are chosen such that over 65% of the original waste sulphite liquor solids are transferred to the upper layer, then the extract contains an excessive amount of interfering substances and when used as a tanning material produces a poor leather. When 50–65% of the waste sulphite liquor solids are transferred to the upper layer, the effect of the interfering substances is apparent but the tanning properties are much superior to waste sulphite liquor. When less than 50% of the original waste sulphite liquor solids is present in the upper phase, the resulting product may be used to produce a leather comparable to that produced from vegetable tannins. As the percentage of solids extracted in the upper phase decreases, the average molecular weight of the fraction likewise decreases and its rate of penetration into hide substance is proportionately increased. Tanning agents with a high rate of penetration may, therefore, be prepared by varying the conditions of extraction.

All extracts prepared by our process penetrate hide more rapidly than does waste sulphite liquor. However, since the penetrating properties improve as less material is extracted, some compromise must be made between yield and tanning properties obtained. It is therefore preferred that 40 to 50% of the original waste liquor solids be transferred to the upper layer.

In the drawing which illustrates this invention:

Figure 1 is a three component phase diagram plotted on triangular coordinates for water, isopropanol and calcium base sulphite liquor solids at 20° C.

In Figure 1 the curve $a, b, c, d, e, f, n, g, q, h, i, j, k, l, m$, showing the composition of the phases at 20° C. for the system water, isopropanol and calcium base sulphite liquor solids. $a-m$, $b-l$, $c-k$, $d-j$, $e-i$ and $f-h$ are tie lines. $g$ is a critical point. The portion of the curve including points $a, b, c, d, e, f, n$ represents the lower phase and the portion of the curve including points $g, h, i, j, k, l, m$ represents the upper phase. The shaded area defined by the lines connecting the points $g, n, o, p, q, g$ represents the conditions under which the process of this invention should be operated.

It will be apparent from Figure 1 that the percentage of solids transferred to the upper phase depends on the concentration of the waste sulphite liquor and the quantity of isopropanol added to the waste sulphite liquor. The following features will also be apparent:

(1) The practical upper limit of waste sulphite liquor solids concentration is 65%. If the concentration of the waste sulphite liquor is above 65%, the maximum amount of material transferable to the upper phase will be too low to permit commercial operation.

(2) The practical lower limit of waste sulphite liquor concentration is 25%. If the concentration of waste sulphite liquor is too low, prohibitive volumes of isopropanol must be added to produce an upper phase substantially free of interfering substances. This effect will be apparent by referring to Figure 1. Further, the concentration of tanning agent in the upper phase will be too low to permit economic recovery. We have found that as the concentration of tanning agent in the upper phase decreases, the tannin purity (defined as the percentage of solids which combine with hide substance) likewise decreases. The tannery requirement of the highest possible tannin purity compatible with other requirements thus prohibits the use of dilute liquors in the application of our invention.

(3) The preferred waste sulphite liquor concentration is 35% to 50%.

(4) The minimum amount of isopropanol required to form two phases is a function of waste sulphite liquor concentration, and increases with decreasing liquor concentration.

(5) The practical upper limit is 3 volumes of isopropanol per volume of concentrated waste sulphite liquor, the lower limit being the amount required to form two phases. As the amount of isopropanol added is increased over the minimum required to form two phases, the concentration of tanning agent in the upper phase decreases, resulting in increased recovery costs and decreased tannin purity.

Different waste sulphite liquors, such as sodium base, ammonium base, or magnesium base, will give diagrams of the same general type and shape as Figure 1, but the curve defining miscibility limits may be shifted to the right or left. Also the exact position of the curve is dependent on cooking variables associated with the production of the pulp. Temperature has likewise an effect on the miscibility limits of isopropanol-waste sulphite liquor systems, the curve being shifted to the right with increased temperature. The diagram, Figure 1, then gives a qualitative description of the behaviour of any waste sulphite liquor when treated with isopropanol, but the exact liquor concentrations and isopropanol volumes required to produce a particular product will vary from liquor to liquor, and are best determined experimentally. With the aid of the following generalizations, the optimum conditions for any particular liquor may easily be determined.

(1) The preferred percentage of liquor solids to be transferred to the upper phase is about 40 to 50%. This figure may be increased to 65% with some loss of tannin quality, or may be reduced to as low as 15% with concomitant increase in rate of penetration of the resulting tanning agent.

(2) The preferred amount of isopropanol to be added is the minimum required to form two liquid phases. This minimum quantity decreases with increasing concentration of the waste sulphite liquor. For convenience of operation, isopropanol in excess of this minimum quantity, but not exceeding 3 volumes per volume of concentrated liquor, may be added. As the amount of isopropanol added is increased, both the yield of tanning agent, and the tannin purity, decrease; larger excesses of isopropanol should, therefore, be avoided.

(3) The preferred concentration of waste sulphite liquor is that which produces the desired percentage of total solids in the upper phase (as outlined in section 1 above) when the liquor is treated with the preferred amount of isopropanol or a small excess. This preferred concentration varies from liquor to liquor, and lies in the range of 25% to 65%. Agitation such as stirring should be used to mix the waste liquor with the alcohol.

Separation of the two phases may be carried out in any convenient manner such as by settling and decantation; centrifugation may be used if desired. The isopropanol or other alcohol is removed from the organic phase by distillation. A simple distillation is used and is continued until the distillation is substantially free of isopropanol. The distillate consisting of isopropanol and 10% or more of water may be returned to the process for reuse. If desired, fractional distillation may be used.

The application of our invention is illustrated by the following experiments. Our invention is not limited to these experiments which are to be considered as examples only.

EXPERIMENT I.—ILLUSTRATING THE EFFECT OF LIQUOR CONCENTRATION AND QUANTITY OF ISOPROPANOL ON THE AMOUNT OF SOLIDS TRANSFERRED TO THE UPPER PHASE

Different waste sulphite liquors at various concentrations were shaken with varying amounts of isopropanol and the amount of material transferred to the organic phase determined. The results obtained are shown in Table I.

Table I

CALCIUM BASE

| Solids Concentration of Liquor, Percent (Weight/Volume) | Volumes of Isopropanol per Volume of Waste Sulphite Liquor | Solids Concentration In Upper Phase, Percent (Weight/Volume) | Percent of Original Solids in Upper Phase |
|---|---|---|---|
| 25.7 | 0.80 | 11.67 | 69.4 |
| 25.7 | 0.90 | 9.01 | 54.4 |
| 25.7 | 1.12 | 6.09 | 40.6 |
| 25.7 | 1.45 | 3.95 | 32.0 |
| 25.7 | 2.10 | 2.31 | 24.2 |
| 25.7 | 2.80 | 1.52 | 19.5 |
| 38.2 | 0.86 | 9.03 | 28.7 |
| 38.2 | 0.98 | 7.05 | 25.2 |
| 38.2 | 1.38 | 4.07 | 18.2 |
| 47.0 | 0.62 | 16.10 | 19.5 |
| 47.0 | 0.70 | 10.80 | 19.4 |
| 47.0 | 1.10 | 5.14 | 15.6 |

SODIUM BASE

| | | | |
|---|---|---|---|
| 15 | 3.0 | 3.05 | 76.0 |
| 15 | 4.0 | 2.03 | 63.3 |
| 15 | 6.0 | 1.23 | 53.2 |
| 15 | 8.0 | 0.90 | 50.0 |
| 15 | 10.0 | 0.70 | 48.0 |
| 47.1 | ¹0.97 | 20.50 | 61.8 |
| 47.1 | 1.46 | 9.26 | 37.0 |
| 47.1 | 3.0 | 4.25 | 32.3 |
| 50.5 | ¹0.86 | 22.22 | 35.4 |
| 50.5 | 1.29 | 10.15 | 30.3 |
| 50.5 | 3.00 | 4.05 | 31.0 |
| 54.2 | ¹0.77 | 20.62 | 19.8 |
| 54.2 | 1.15 | 10.56 | 26.9 |
| 54.2 | 1.54 | 7.39 | 24.4 |
| 54.2 | 3.00 | 4.02 | 24.4 |
| 70.6 | ¹0.44 | | nil |
| 70.6 | 0.64 | 11.56 | 7.3 |
| 70.6 | 0.84 | 10.12 | 10.7 |
| 70.6 | 4.00 | 2.23 | 12.5 |

¹ Minimum isopropanol to form two phases.

Experiment I illustrates several important points, namely:

(1) By appropriate choice of conditions, any desired percentage of solids may be transferred to the upper phase.

(2) The concentration of dissolved material in the upper phase decreases with increasing quantities of isopropanol; the highest concentration is obtained when just sufficient isopropanol is added to yield two phases.

(3) At a waste sulphite liquor concentration of 15% (about the highest concentration at which liquor is discharged from the digestor) prohibitive volumes of isopropanol are required to produce a satisfactory tanning agent i.e. one which contains less than 65% of the total solids of the liquor. Further, the concentration of tanning agent in the upper phase is less than 2%. The processing and recovery of tanning agents from such dilute solutions is not desirable from an economic point of view.

(4) At waste sulphite liquor concentrations above 65%, the maximum amount of material which may be transferred to the upper phase is less than 15%. While this material is a satisfactory tanning agent, the yield is too low for practical operation.

EXPERIMENT II.—ILLUSTRATING THE EFFECT OF SOLIDS CONCENTRATION IN THE UPPER PHASE ON TANNIN PURITIES

Tanning agents were prepared in approximately equal yield by (1) adding isopropanol to concentrated waste sulphite liquor, and (2) adding isopropanol to dilute waste sulphite liquor. The ratios of isopropanol to waste sulphite liquor are set forth in Table II.

Table II

| Solids Concentration of Liquor, Percent (Weight/Volume) | Volumes of Isopropanol per Volume of Waste Sulphite Liquor | Percent Original Solids in Upper Phase | Gallons of Isopropanol to yield 1 lb. of tannin | Solids Concentration in Upper Phase (Percent) | Tannin Purity, Percent |
| --- | --- | --- | --- | --- | --- |
| 46.2 | 1.075 | 55.5 | 1.6 | 18.2 | 31.2 |
| 46.2 | 1.10 | 48.5 | 2.1 | 15.9 | 28.7 |
| 15.5 | 5.5 | 56.4 | 40 | 1.38 | 19.0 |
| 15.5 | 9.5 | 45.5 | 107 | 0.68 | 15.1 |

This experiment shows that a given percentage of total solids may be transferred to the upper phase by adding large amounts of isopropanol to dilute liquor, or by adding smaller amounts of isopropanol to more concentrated liquor. The effect of the former procedure is to increase isopropanol requirements by factors of 25 to 50, and to reduce the tannin purity by almost 50%. It is thus necessary that the waste sulphite liquor concentration be at least 25%, and that not more than 3 volumes of isopropanol per volume of concentrated liquor be employed.

EXPERIMENT III.—ILLUSTRATING THE QUALITY OF TANNAGE OBTAINED WITH VARIOUS WASTE SULPHITE LIQUOR FRACTIONS USING GRAIN SPLITS

Tannin solutions were prepared by shaking waste sulphite liquor at a range of concentrations with various ratios of isopropanol, separating the upper phase, and removing the isopropanol by distillation.

Specimens of approximately 4" x 4" cow hide grain splits were depickled, adjusted to pH 5.0, and then washed. The specimens were then shaken with 2% tannin solution at pH 5.0 for 24 hours, with 3% tannin solution at pH 4.0 for another 24 hours, and finally with 3% tannin solution at pH 3.0 for a further 24 hours. The specimens were then washed at 40° C., squeezed free of excess moisture, oiled off and then dried at room temperature and 65% R.H.

The results of this grain split tannage are given in Table III.

Table III

CALCIUM BASE

| Solids Concentration of Liquor, Percent (Weight/Volume) | Volumes of Isopropanol per Volume of Waste Sulphite Liquor | Percent of Original Solids in Upper Phase | Leather Properties | |
| --- | --- | --- | --- | --- |
| | | | Colour | Fullness, Softness Flexibility |
| 25.7 | 2.8 | 19.5 | Pale tan | Good. |
| 25.7 | 2.1 | 24.2 | do | Do. |
| 25.7 | 1.45 | 36.2 | do | Do. |
| 25.7 | 1.12 | 40.6 | Tan | Do. |
| 25.7 | 0.90 | 54.4 | Some dark spots | Fair. |
| 25.7 | 0.80 | 69.4 | Uneven dark | Poor. |

AMMONIA BASE

| | | | | |
| --- | --- | --- | --- | --- |
| 28.0 | 2.6 | 26.2 | Brown | Good. |
| 28.0 | 1.0 | 37.0 | Dark Brown | Do. |
| 45.2 | 2.5 | 18.9 | Brown | Do. |
| 45.2 | 1.5 | 26.5 | do | Do. |
| 45.2 | 1.0 | 42.8 | Dark Brown | Fair. |

SODIUM BASE

| | | | | |
| --- | --- | --- | --- | --- |
| 28.6 | 3.0 | 39.4 | Light grey | Very good. |
| 28.6 | 2.0 | 49.5 | do | Good. |
| 28.6 | 1.5 | 66.6 | Grey | Fair. |
| 28.6 | 0.9 | 89.4 | Brown | Poor. |
| 44.4 | 3.0 | 24.9 | Light grey brown | Good. |

These experiments show that if more than 65% of the total solids of the liquor are transferred to the upper phase, poor leathers are produced. With between 50% and 65% of the total solids in the upper phase there is a marked improvement in leather properties. With less than 50% in the upper phase, full, soft, flexible leathers are obtained. Ammonia base liquors gave dark leathers, whereas calcium and sodium base liquors gave light coloured leathers.

EXPERIMENT IV.—A COMPARISON OF LEATHERS PRODUCED BY TANNING FULL THICKNESS COW HIDE WITH WASTE SULPHITE LIQUOR AND WITH VARIOUS ISOPROPANOL EXTRACTS

The isopropanol extracts used in this experiment were prepared in accordance with the methods outlined in Experiment I.

Specimens of full thickness cowhide were immersed in solutions of the various extracts containing 1% tannin, as determined by the Official Method of the American Leather Chemists' Association. A hide to liquor ratio of 1:6 was used in all cases and the pH was maintained at 4.8 throughout the experiments. The tannin concentration was increased at 3 to 4 day intervals by the addition of concentrated liquor, until after 28 days, a total of 10 times the initial amount of tannin had been added. After 31 days the hide pieces were washed briefly, oiled off and dried. The results of these tanning experiments are given in Table IV.

Table IV

| Percent of Original Total Solids in Upper Phase | Average Molecular[1] Weight | Penetration | Appearance of Leather |
| --- | --- | --- | --- |
| 19.4 | 840 | fully penetrated | full, flexible, light grey-brown. |
| 54.5 | 1,400 | do | Do. |
| 69.4 | | 25% penetrated from grain side, 20% penetrated from flesh side; interior partly penetrated. | less flexible, grey-brown. |
| Original Liquor | 5,700 | central layer very translucent, not penetrated. | hard, dark grey-brown. |

[1] Determined by diffusion measurements through a calibrated sintered glass diaphragm, using ultraviolet absorption at 2,800 A. as a measure of the lignin concentration.

Experiment IV shows that tanning agents containing less than 55% of the original liquor solids penetrated fully under conditions similar to tannery practice, yielding a full flexible leather. Under the same conditions the original waste sulphite liquor did not penetrate completely and left the central layer of the hide untanned. Similarly a fraction containing over 65% of the original liquor solids did not penetrate completely. The experiment also shows that the rate of penetration increased as the average molecular weight and percentage of total solids in the upper phase decreased.

What we claim as our invention is:

1. A process for making a tanning agent which comprises the steps of concentrating waste sulphite liquor to a solids content of between 25% and 65%, extracting effective tannins from the concentrated waste sulphite liquor with a water miscible alcohol that is capable of forming two phases with concentrated sulphite waste liquor, said alcohol being in an amount that will extract between 15% and 65% of the sulphite liquor solids, separating the alcohol rich phase, and stripping the alcohol from the alcohol rich phase to leave a tanning agent.

2. A process for making a tanning agent which comprises the steps of extracting effective tannins from a concentrated waste sulphite liquor having a solids content of between 25% and 65% by means of a water miscible alcohol that is capable of forming two phases with concentrated sulphite waste liquor, said alcohol being in an amount that will extract between 15% and 65% of the sulphite liquor solids, separating the alcohol rich phase, and stripping the alcohol from the alcohol rich phase to leave a tanning agent.

3. A process as in claim 2 in which said sulphite waste liquor is obtained from an acid sulphite process.

4. A process as in claim 2 in which said sulphite waste liquor is obtained from a sodium or ammonium base process.

5. A process as in claim 2 in which the solids content of said waste liquor is 35% to 50%.

6. A process as in claim 2 in which said alcohol is a monohydric alcohol having not more than four carbon atoms.

7. A process as in claim 2 in which said alcohol is isopropanol.

8. A process as in claim 2 in which 40% to 50% of the solids content of said concentrated waste liquor are extracted into the alcohol rich phase.

9. A process as in claim 2 in which said sulphite waste liquor is obtained from an acid sulphite process and has a solids content of 35% to 50% and in which said alcohol is a monohydric alcohol having not more than four carbon atoms.

10. A process as in claim 2 in which said sulphite waste liquor is obtained from an acid sulphite process and has a solids content of 35% to 50%, in which said alcohol is isopropanol and in which 40% to 50% of the solids content of said concentrated waste liquor are extracted into the isopropanol rich phase.

11. A tanning agent consisting essentially of the low molecular weight tannins that are extracted from a concentrated sulphite waste liquor having solids content of 25% to 65% with isopropanol in an amount such that 15% to 65% of the waste liquor solids are extracted in the isopropanol.

12. A tanning agent consisting essentially of the low molecular weight tannins that are extracted from a concentrated waste liquor of an acid sulphite process having a solids content of 25% to 65% with isopropanol in an amount such that 40% to 50% of the waste liquor solids are extracted in the isopropanol.

References Cited in the file of this patent

UNITED STATES PATENTS 2,851,329    Seligsberger  ------------ Sept. 9, 1958

FOREIGN PATENTS 590,907    Great Britain  ----------- July 31, 1947